United States Patent [19]
Berdan II et al.

[11] Patent Number: 5,672,429
[45] Date of Patent: Sep. 30, 1997

[54] GLASS FIBER INSULATION PRODUCT

[75] Inventors: Clarke Berdan II, Granville; Ronald A. Houpt, Newark; Russell M. Potter, Hebron; David P. Aschenbeck, Newark, all of Ohio

[73] Assignee: Owens-Corning Fiberglas Technology, Inc., Summit, Ill.

[21] Appl. No.: 583,734

[22] Filed: Jan. 17, 1996

Related U.S. Application Data

[63] Continuation of Ser. No. 329,804, Oct. 26, 1994, Pat. No. 5,629,089, which is a continuation of Ser. No. 148,746, Nov. 5, 1993, abandoned.

[51] Int. Cl.$^6$ .................................................. D02G 3/00
[52] U.S. Cl. .................... 428/401; 428/311.5; 428/332; 428/333; 428/340; 428/364; 428/903; 428/392; 65/437; 501/35
[58] Field of Search .......................... 428/392, 397, 428/399, 33.2, 33.3, 311.5, 340, 364, 401, 903; 65/437, 438, 439, 443; 52/404.1, 743; 501/35

[56] References Cited

U.S. PATENT DOCUMENTS

| | | |
|---|---|---|
| 2,219,285 | 10/1940 | Allen et al. .......................... 154/28 |
| 2,230,272 | 8/1941 | Slayter . |
| 2,300,736 | 11/1942 | Slayter et al. . |
| 2,313,296 | 3/1943 | Lamesch . |
| 2,313,630 | 3/1943 | Dockerty . |
| 2,331,945 | 10/1943 | Pazsiczky et al. . |
| 2,509,845 | 5/1950 | Slayter . |
| 2,722,718 | 11/1955 | Siu . |
| 2,927,621 | 3/1960 | Slayter . |
| 2,998,620 | 9/1961 | Stalego ............................... 18/2.6 |
| 3,073,005 | 1/1963 | Tiede . |
| 3,653,861 | 4/1972 | Stalego et al. . |
| 3,881,903 | 5/1975 | Stalego . |
| 4,145,199 | 3/1979 | Russell . |
| 4,184,643 | 1/1980 | Mc Cort ............................. 241/87 |
| 4,201,247 | 5/1980 | Shannon ............................ 138/141 |
| 4,296,164 | 10/1981 | Bemis et al. ...................... 428/219 |
| 4,347,985 | 9/1982 | Simpson ............................ 241/1 |
| 4,366,927 | 1/1983 | Kielmeyer ......................... 241/4 |
| 4,373,005 | 2/1983 | Goodwin ........................... 428/357 |
| 4,542,044 | 9/1985 | Garo et al. ........................ 427/215 |
| 4,555,447 | 11/1985 | Srelott et al. ..................... 428/392 |
| 4,682,523 | 7/1987 | Johnson et al. .................. 83/19 |
| 4,756,957 | 7/1988 | Kielmeyer ......................... 428/288 |
| 4,829,738 | 5/1989 | Moss ................................. 52/743 |
| 4,842,928 | 6/1989 | Kielmeyer ......................... 428/288 |
| 4,909,817 | 3/1990 | Gill et al. ......................... 65/8 |
| 5,035,936 | 7/1991 | Dockrill et al. .................. 428/96 |

OTHER PUBLICATIONS

Don Paul, Polymer Blends, Academic Press, 1978.

*Primary Examiner*—Merrick Dixon
*Attorney, Agent, or Firm*—C. Michael Gegenheimer; Curtis B. Brueske

[57] ABSTRACT

A glass fiber insulation product includes irregularly-shaped glass fibers of two different glasses having differing coefficients of thermal expansion, with the irregularly-shaped dual-glass fibers exhibiting a substantially uniform volume filling nature, and providing improved recovery and thermal conductivity abilities even in the absence of a binder material.

3 Claims, 11 Drawing Sheets

GLASS FIBER INSULATION PRODUCT

This is a continuation of application Ser. No. 08/329,804, filed Oct. 26, 1994, now U.S. Pat. No. 5,629,089 which in turn is a continuation of application Ser. No. 08/148,746, filed Nov. 5, 1993, now abandoned.

TECHNICAL FIELD

This invention relates to wool materials of mineral fibers and, more specifically to insulation products of glass fibers. The invention also pertains to the manufacture of the insulation products of glass fibers.

BACKGROUND OF THE INVENTION

Small diameter glass fibers are useful in a variety of applications including acoustical or thermal insulation materials. When these small diameter glass fibers are properly assembled into a lattice or web, commonly called a wool pack, glass fibers which individually lack strength or stiffness can be formed into a product which is quite strong. The glass fiber insulation which is produced is lightweight, highly compressible and resilient. For purposes of this patent specification, in using the terms "glass fibers" and "glass compositions", "glass" is intended to include any of the glassy mineral materials, such as rock, slag and basalt, as well as traditional glasses.

The common prior art methods for producing glass fiber insulation products involve producing glass fibers from a rotary process. A single molten glass composition is forced through the orifices in the outer wall of a centrifuge or spinner, producing primarily straight glass fibers. The fibers are drawn downward by a blower. The binder required to bond the fibers into a wool product is sprayed onto the fibers as they are drawn downward. The fibers are then collected and formed into a wool pack.

When forming insulation products of glass fibers, the ideal insulation would have uniform spacing between the fibers. Insulation is basically a lattice for trapping air between the fibers and thus preventing movement of air. The lattice also retards heat transfer by scattering radiation. A more uniform spacing of fibers would maximize scattering and, therefore, would have greater insulating capability.

In the production of wool insulating materials of glass fibers, it becomes necessary to use fibers that are relatively short. Long fibers tend to become entangled with each other forming ropes or strings. These ropes create a deviation from the ideal uniform lattice and reduce the insulating abilities of the glass wool. However, short fibers that are straight form only a haphazard lattice, and some of the fibers lie bunched together. It is clear that existing glass wool insulating materials have significant non-uniformities in the distribution of fibers within the product. Thus, the ideal uniform lattice structure cannot be achieved.

Additionally, when using straight fibers it is necessary to add an organic binder material to the fibers. The binder is required to hold the product together by bonding at the fiber to fiber intersections. Not only is the binder itself expensive, but great pains must be taken to process effluent from the production process due to the negative environmental impact of most organic compounds. Further, the binder must be cured with an oven using additional energy and creating additional environmental cleanup costs.

Another problem with existing insulation products is that some of the glass fibers irritate human skin upon contact, particularly if the fibers are too large in diameter. Also, if the glass fibers are fragile, breakage of the fibers can cause the insulation products to be dusty.

In the shipping and packaging of insulation products, high compressibility is preferred. It is desirable to compress the wool for shipping and then have it recover rapidly and reliably to the desired size. Current insulation products are limited in the amount of compression possible while still attaining adequate recovery. When the product is compressed, the binder holds firm while the fibers themselves flex. As the stress upon the fiber increases due to excessive compression, the fiber breaks.

Attempts have been made in the prior art to produce non-straight glass fibers. In a mechanical kink process, glass fibers are pulled from a textile bushing. While still at high temperatures, the fibers are pulled by mechanical means through a series of opposed gears or a crimping device to attenuate and crimp them. The net result is a bundle of kinked glass fibers.

The major disadvantage to mechanical kinking is that the fibers are not conducive to satisfactory glass wool production. Every fiber produced in this manner has a uniform shape, defeating the purpose of the kink, because the glass wool produced does not have a uniform distribution. Further, because the process is non-rotary, it has an unsatisfactory low throughput and the fibers produced are too coarse for wool insulating materials.

Stalego in U.S. Pat. No. 2,998,620 discloses curly glass fibers of bicomponent glass compositions. Stalego teaches producing staple curly fibers by passing two glass compositions of differing thermal expansivity through the orifices of a spinner. The glasses are extruded as a dual glass stream in aligned integral relationship such that the fibers curl naturally upon cooling due to the differing thermal expansivity. However, Stalego discloses employing the curled fibers in the processing of yarns such as being woven into fabric or included as a reinforcement in fired pottery and clays. Stalego does not disclose the use of curly fibers in insulation products.

Tiede in U.S. Pat. No. 3,073,005 discloses a non-rotary process for making bicomponent curly glass fibers. The fibers are made by feeding differing glass compositions to an orifice in side by side contact such that the two glasses are attenuated into a single fiber. Tiede discloses using the glasses in fabric production as well as cushion and floatation materials. Tiede does not disclose insulation products made with curly glass fibers.

Slayter et al. in U.S. Pat. No. 2,927,621 also disclose the production of curly fibers. In Slayter, glass fibers of a single glass composition are passed through opposed contoured skirts after the fibers have been softened by hot gases. The fibers then take on the shape of the contour of the skirts. However, the thick, long fibers are unsuitable for insulating materials. Rather, the produced fibers are employed in filtering media, and additionally have a binder applied.

Accordingly, a need exists for an improved wool insulating material with a uniform volume filling nature such that the wool insulating material has improved recovery and reduced thermal conductivity and can be employed without the use of a binder material. Also, it would be beneficial to solve the irritation and dustiness problems of existing glass fiber insulation products.

SUMMARY OF THE INVENTION

This need is met by the present invention whereby insulation products are produced from mineral fibers which are irregular in shape. By employing fibers that are irregular, rather than straight, kinked or even curly, a more uniform lattice structure can be achieved. This is referred to as uniform volume filling. The increased uniformity will allow higher recovery ratios. More importantly, uniform volume filling results in significantly lower thermal conductivity. Also, the greater entanglement of irregularly-shaped fibers could allow sufficient wool pack integrity without the use of an organic binder. By sufficient integrity it is meant that the fibers of the wool batt will remain entangled and not separate when an 8 ft. (2.4 m) wool batt is suspended under its own weight either along its length or along its width. These are referred to as the machine direction and the cross direction, respectively. However, if so desired, a binder material may be added to provide additional strength to the wool insulating material. Also, the irregular shape of the fibers of the invention makes the product less prone to cause irritation, and may make the product less dusty.

In accordance with the preferred embodiment of the invention there is provided an irregularly-shaped glass fiber and an insulation product comprising irregularly-shaped glass fibers. The insulation product of irregularly-shaped glass fibers has a substantially uniform volume filling nature. Further, the irregularly-shaped glass fibers preferably contained binder materials comprising less than or equal to 1% by weight of the product. Further, the term "binder" is not meant to include materials added for dust suppression or lubrication. Each of the irregularly-shaped glass fibers comprises two distinct glass compositions with different coefficients of thermal expansion. The difference in the coefficient of thermal expansion between the two glass compositions is preferably greater than about 2.0 ppm/°C. (parts per million), more preferably greater than about 4.0 ppm/°C. and most preferably greater than about 5.0 ppm/°C.

In accordance with a further aspect of the present invention there is provided an insulation product of irregularly-shaped glass fibers, the insulation product having a substantially uniform volume filling nature, wherein the product has a recovered density within the range of from about 0.3 to about 0.6 pcf (pounds per ft$^3$) (4.8 to 9.6 Kg/m$^3$), after compression to a compressed density of from about 6 to about 18 pcf (96 to 288 Kg/m$^3$).

In accordance with another aspect of the invention there is provided a wool insulating material comprising irregularly-shaped glass fibers with a substantially uniform volume filling nature, wherein each of the irregularly-shaped glass fibers consists of at least a first glass composition and a second glass composition. The first glass composition generally varies within the range of from about 15 to about 85% of the total glass content of each fiber. The second glass composition comprises the balance of the glass content of each fiber. A small fraction of the fibers may be single composition.

DETAILED DESCRIPTION OF THE PREFERRED EMBODIMENTS

Figure 1:
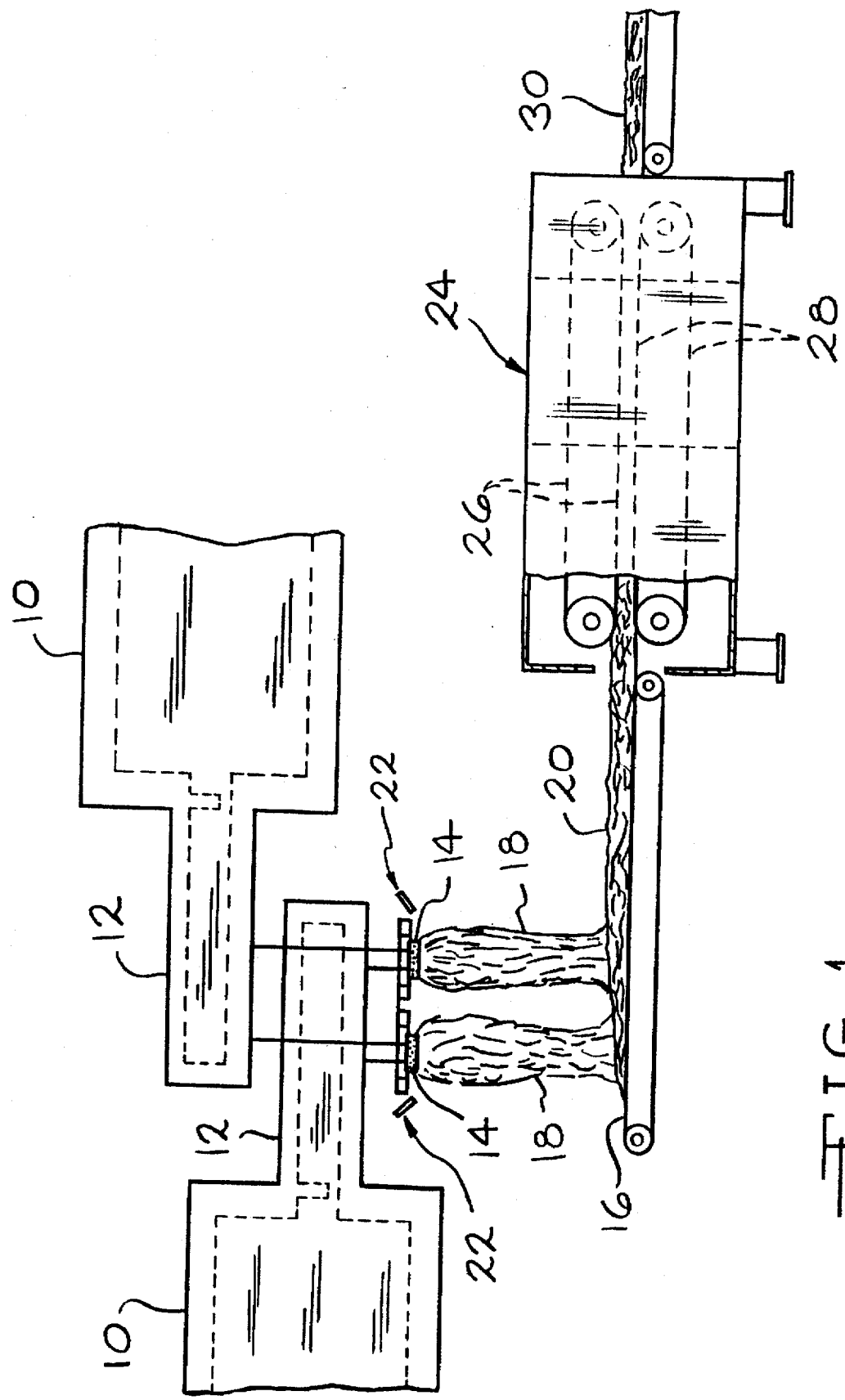
FIG. 1 is a schematic view in elevation of a heat setting process by which the insulation of the present invention may be produced.

The insulation products of irregularly-shaped glass fibers of the present invention can be produced from a rotary fiber forming and pack heat setting process as shown in FIG. 1.

Referring to FIG. 1, it can be seen that two distinct molten glass compositions are supplied from furnaces 10 via forehearths 12 to fiberizers 14. Veils of irregularly-shaped glass fibers 18 produced by the fiberizers are collected on conveyor 16 as wool pack 20 by means of a vacuum positioned beneath the conveyor. As the fibers are blown downward by air or gases to the conveyor by means of blowers 22 in the fiberizers, they are attenuated and assume their irregular shape.

The wool pack is then passed through oven 24 at heat setting temperatures from 700° to 1100° F. (371° to 593° C.). The heat setting temperature may be achieved either by retarding the cooling process after fiber forming to retain some of the heat from the fiber forming process, or by reheating the fibers in the heat setting oven. While passing through the oven, the wool pack is shaped by top conveyor 26 and bottom conveyor 28, and by edge guides, not shown. While in the oven, the glass fibers may be subjected to flows of hot gases to facilitate uniform heating. After a period of up to 10 minutes, the wool pack then exits the oven as insulation product 30.

When glass fibers are constrained by conveyors 26 and 28 into the shape of the insulation product, the fibers are stressed in the manner of a compressed spring. When the stressed fibers are subjected to heat setting temperatures, the glass structure is relaxed, possibly by a creep mechanism, resulting in the stress being substantially released. Once the constraints are removed, the wool pack does not expand but holds the desired shape. Since the fibers bend as they cool, they become more entangled and enhance the insulation product's structural integrity.

It is to be understood that heat setting is an optional aspect of the present invention. Other fabrication techniques for the insulation product include stitching, needling, hydroentanglement, and encapsulation.

Figure 2:
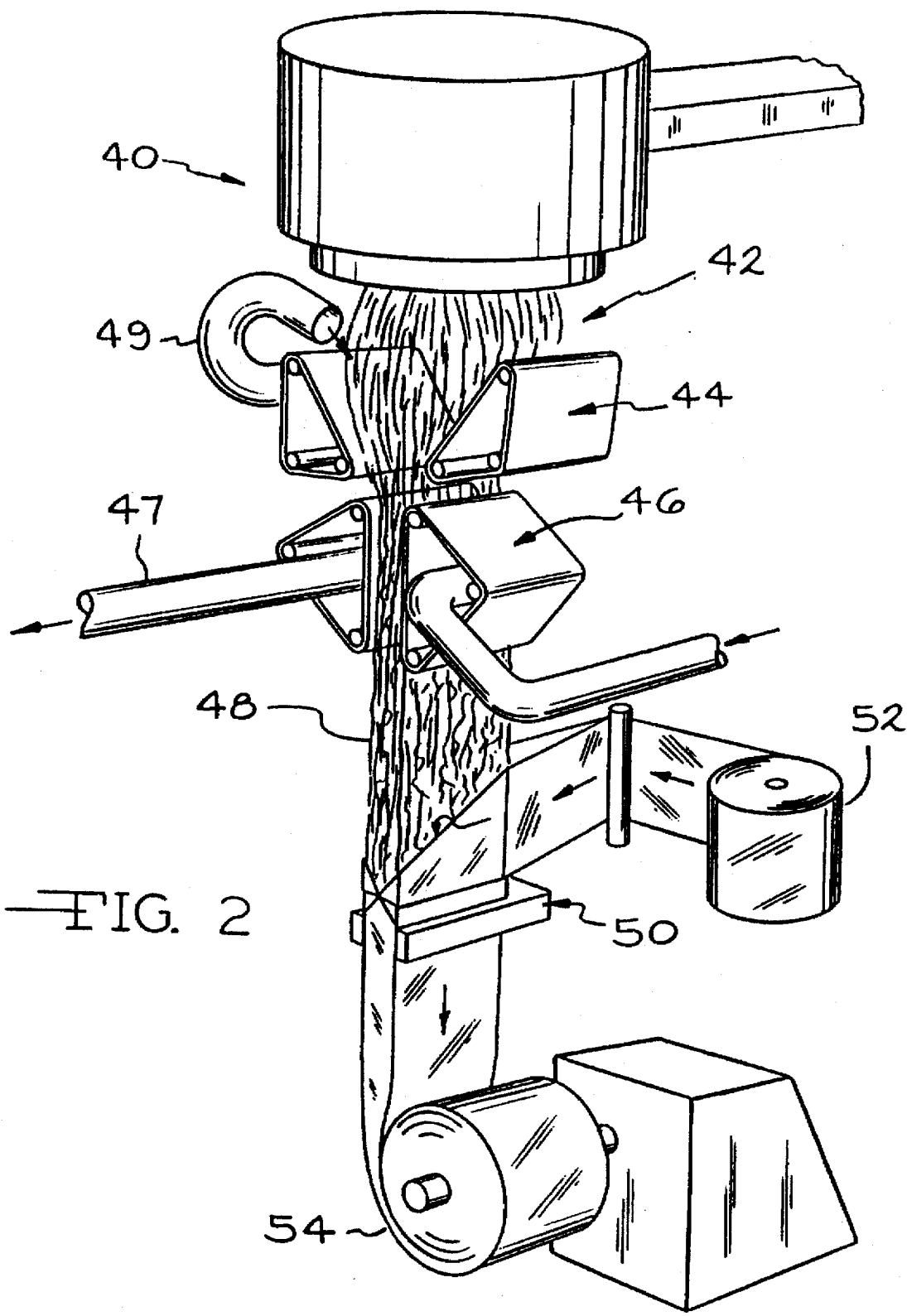
FIG. 2 is a schematic view in perspective of a direct formed process by which the insulation of the present invention may be produced.

Referring to FIG. 2, a novel direct forming process is described through which insulation products of the present invention may be produced. Irregularly-shaped glass fibers are produced in fiberizer 40. Veils 42 of glass fibers are blown downward by means of blowers in the fiberizer and are collected at temperatures of up to 1100° F. (593° C.) on opposed, downwardly converging collection conveyors 44.

The collected fibers are passed through a heat-setting oven, such as pack formation and heat setting conveyors 46, where the fibers are shaped into an insulation product at temperatures within the range of from about 700° F. to about 1100° F. (371° to 593° C.). The heat setting oven, or heat setting conveyors, preferably define a predetermined cross-sectional shape. The heat for heat setting the fibers in the oven can be supplied by any suitable means, such as by hot air ducts 47, connected to a supply of hot gases, not shown, which are adapted to pass heated gases transversely through the wool pack 48.

In a particular aspect of the invention the intercepting conveyors are perforated or foraminous, and gases flowing with the veil of fibers are exhausted through the intercepting conveyors to separate the gases from the fibers. These gases contain considerable heat, and preferably a substantial portion of the exhausted gases is channeled from the intercepting conveyors via conduits 49 to the upper edge of the intercepting conveyors to conserve the heat. Ideally, this recirculation of exhausted gases would maintain the glass fibers exiting the intercepting conveyor at a temperature within the range of from about 400° F. to about 900° F. (204° C. to 482° C.). Waste hot gases from the oven could also be channeled to the upper edge of the intercepting conveyors.

From the formation and heat setting zones of the heat setting conveyors, the insulation product is passed to encapsulation module 50 where the insulation product can be encapsulated with any suitable type of film, such as film 52. Further, the moving product can be cut into individual units, such as insulation batts, prior to packaging. The product can be packaged by any suitable means, such as roll up apparatus 54.

Figure 3:
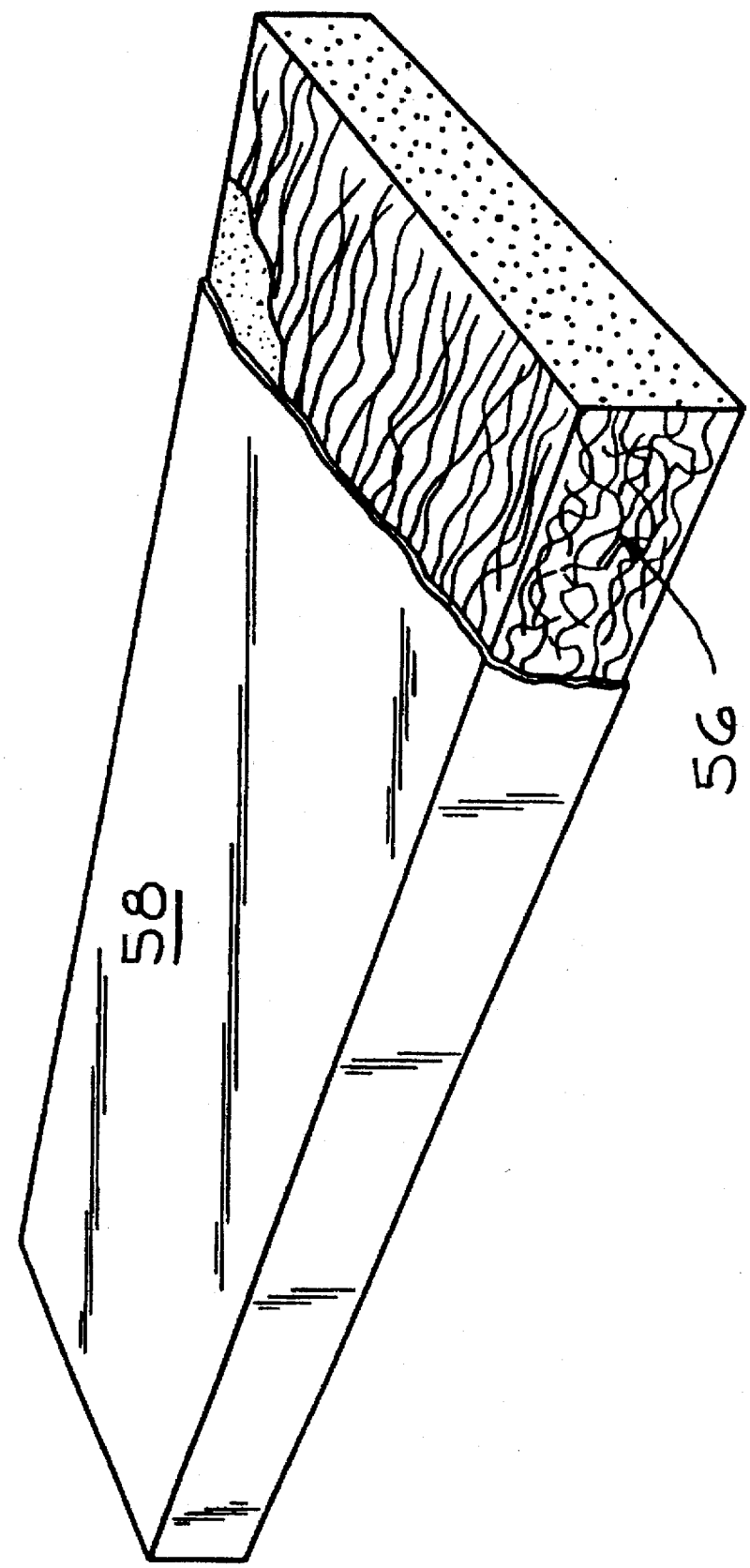
FIG. 3 is a schematic view in perspective of an embodiment of the insulation product of the present invention.

Referring to FIG. 3, the insulation product of the present invention can be in the form of wool batt 56 consisting of irregularly-shaped glass fibers. The batt can be covered by an exterior facing 58, many types of which are known in the prior art.

Figure 4:
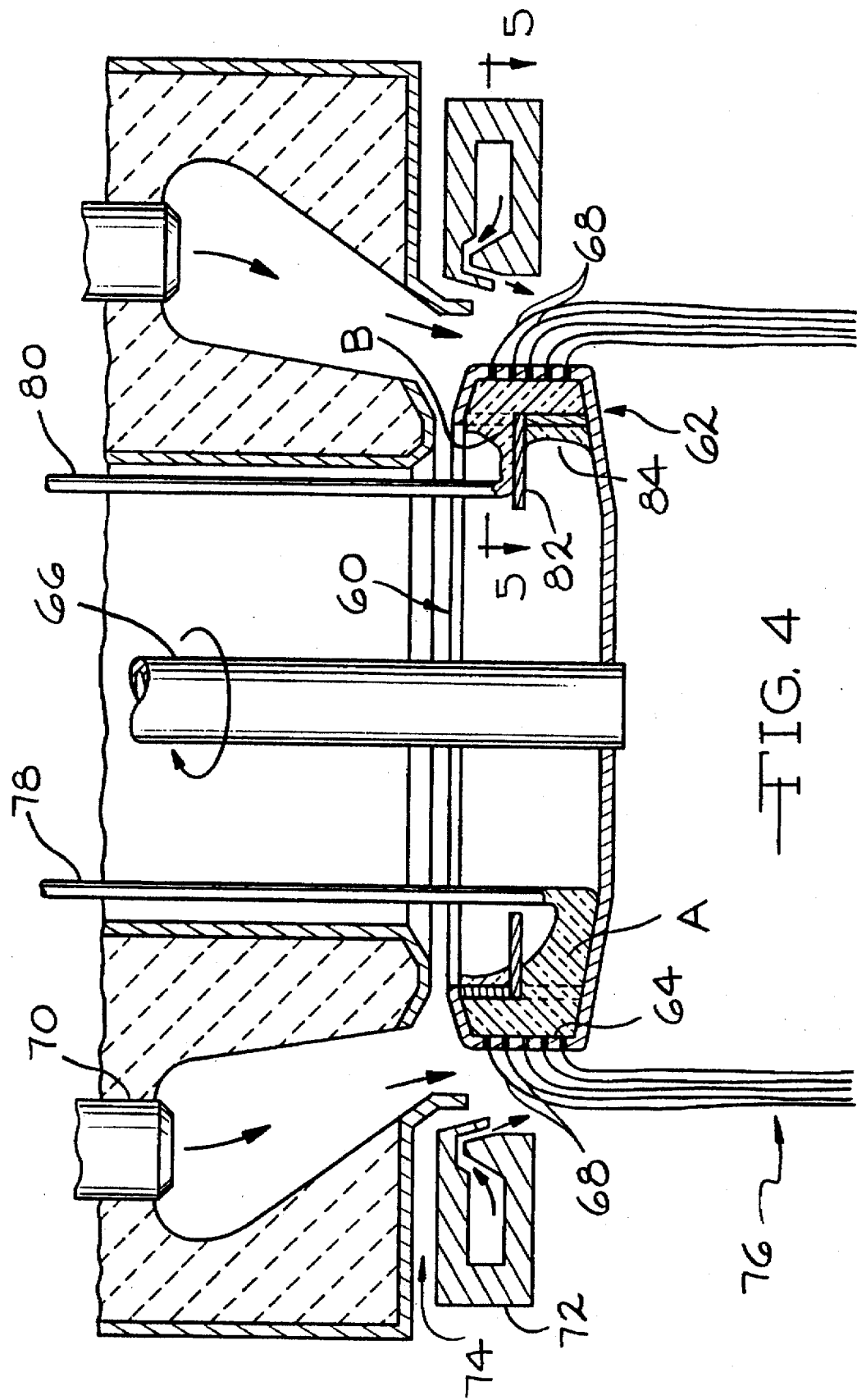
FIG. 4 is a cross-sectional view in elevation of a fiberizer by which the fibers of the present invention may be produced.

As shown in FIG. 4, spinner 60 is comprised of spinner bottom wall 62 and spinner peripheral wall 64. The spinner is rotated on spindle 66, as is known in the prior art. The rotation of the spinner centrifuges molten glass through the spinner peripheral wall into primary fibers 68. The primary fibers are maintained in a soft, attenuable condition by the heat of annular burner 70. In one embodiment of the invention, an internal burner, not shown, provides heat to the interior of the spinner. Annular blower 72, using induced air 74, is positioned to pull the primary fibers and further attenuate them into secondary fibers 76, suitable for use in wool insulating materials. The secondary fibers, or dual-glass irregularly-shaped glass fibers, are then collected for formation into a wool pack.

The interior of the spinner is supplied with two separate streams of molten glass, first stream 78 containing glass A and second stream 80 containing glass B. The glass in stream 78 drops directly onto the spinner bottom wall and flows outwardly with centrifugal force toward the spinner peripheral wall to form a head of glass A. Glass B in molten glass stream 80 is positioned closer to the spinner peripheral wall than stream 78, and the glass in stream 80 is intercepted by horizontal flange 82 before it can reach the spinner bottom wall. Thus, a build-up or head of glass B is formed above the horizontal flange.

Figure 5:
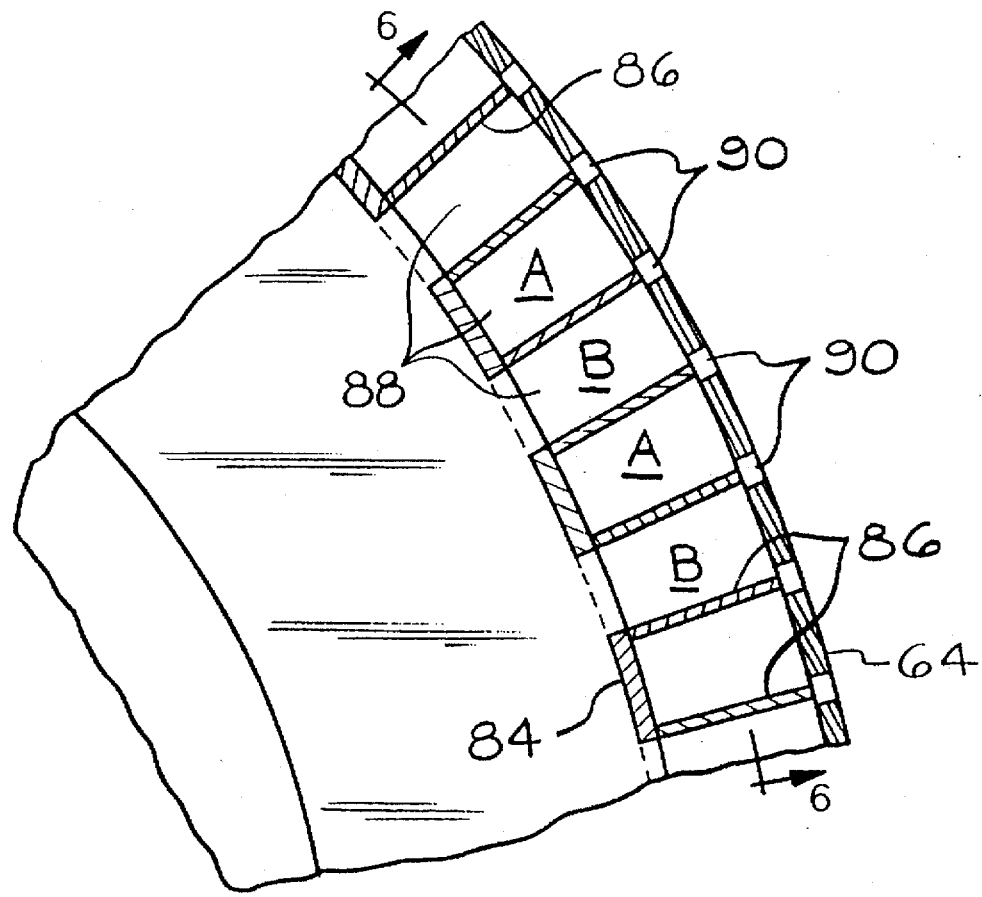
FIG. 5 is a plan view of a portion of the spinner of FIG. 4, taken along line 5—5

As shown in FIG. 5, the spinner is adapted with vertical interior wall 84 which is generally circumferential and positioned radially inwardly from the spinner peripheral wall. A series of vertical baffles 86, positioned between the spinner peripheral wall and the vertical interior wall, divide that space into a series of compartments 88. Alternate compartments contain either glass A or glass B.

Figure 6:
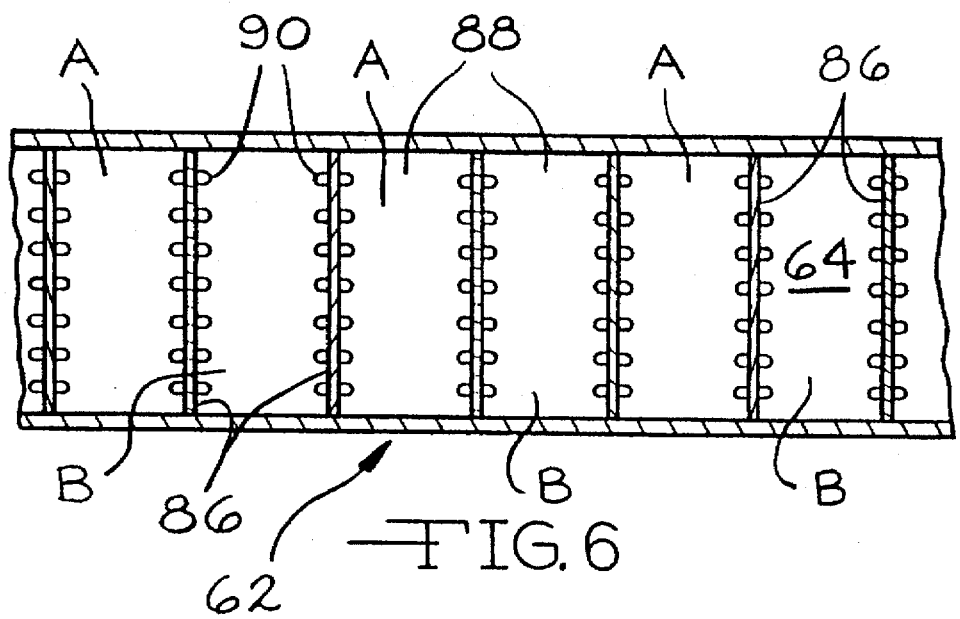
FIG. 6 is a schematic view in elevation of the spinner of FIG. 5 taken along line 6—6.

The spinner peripheral wall is adapted with orifices 90 which are positioned adjacent the radial outward end of the vertical baffle. The orifices have a width greater than the width of the vertical baffle, thereby enabling a flow of both glass A and glass B to emerge from the orifice as a single dual-glass primary fiber. As can be seen in FIG. 6, each compartment 88 runs the entire height of spinner peripheral wall 64 with orifices along the entire vertical baffle separating the compartments. Other spinner configurations can be used to supply dual streams of glass to the spinner orifices.

The irregularly-shaped fibers of the present invention are dual-glass fibers, i.e. each fiber is composed of two different glass compositions, glass A and glass B. If one were to make a cross-section of an ideal irregularly-shaped glass fiber of the present invention, one half of the fiber would be glass A, with the other half glass B. In reality, a wide range of proportions of the amounts of glass A and glass B may exist in the various irregularly-shaped glass fibers in the wool insulating material (or perhaps even over the length of an individual fiber). The percentage of glass A may vary within the range of from about 15 to about 85% of the total glass in each of the irregularly-shaped glass fibers with the balance of total glass being glass B. In general, insulation products of the irregularly-shaped fibers will consist of fibers of all different combinations of the percentages of glass A and glass B, including a small fraction of fibers that are single component.

Figure 7:
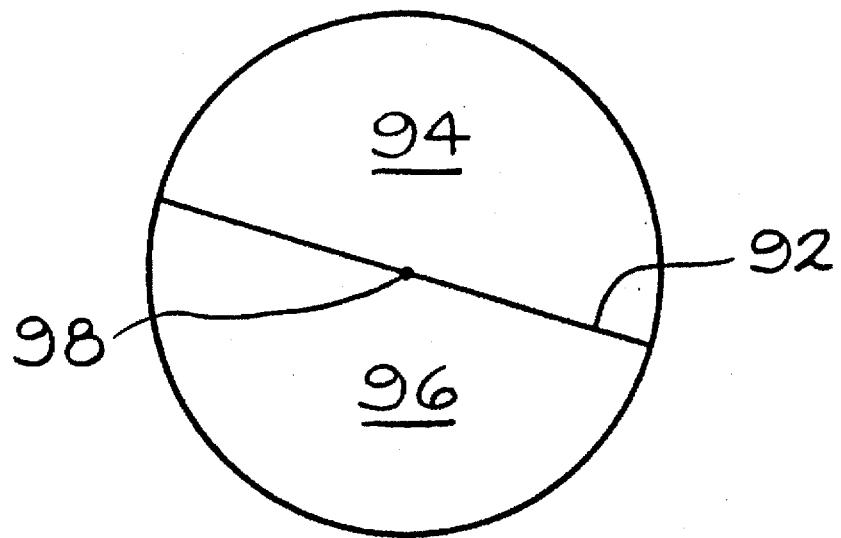
FIG. 7 is a schematic cross-sectional view of an irregular glass fiber of the invention having a 50:50 A/B glass ratio.
Figure 8:
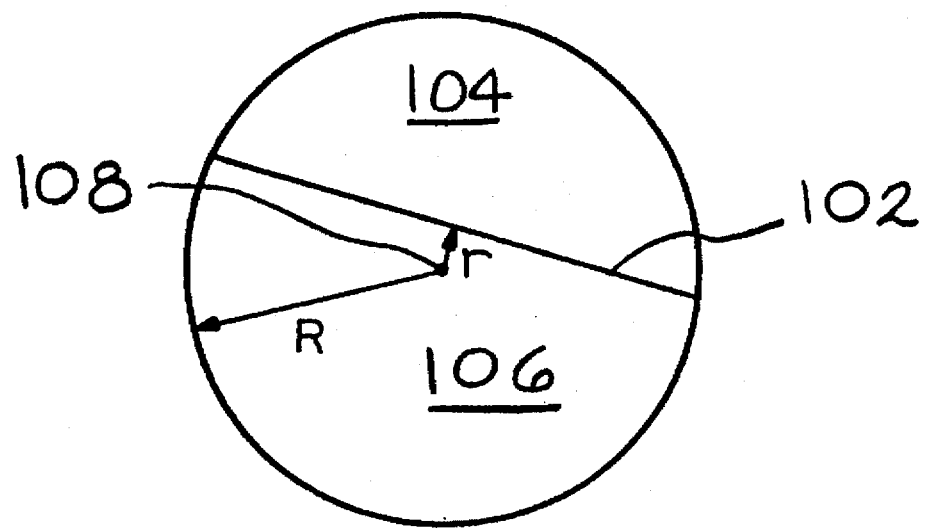
FIG. 8 is a schematic view of an irregular glass fiber having an A/B glass ratio of less than 50:50.

A method for measuring the proportion of glass A to glass B involves examining the cross-section of a multiplicity of fibers. If the A/B ratio is 50:50, the interface 92 between the two glasses, glass A 94 and glass B 96, will pass through the center 98 of the fiber cross-section, as shown in FIG. 7. Usually the interface between the two glasses is a line which does not pass through the center of the fiber cross-section. As shown in FIG. 8, interface 102 between glass A 104 and glass B 106 does not pass through center 108 of the fiber.

Cross-section photographs of fibers are obtained by mounting a bundle of fibers in epoxy with the fibers oriented in parallel as much as possible. The epoxy plug is then cross-sectioned using a diamond saw blade, and one of the new surfaces is polished using various grinding media. The polished sample surface is then coated with a thin carbon layer to provide a conductive sample for analysis by scanning electron microscopy (SEM). The sample is then examined on the SEM using a backscattered-electron detector, which displays variations in average atomic number as a variation in the gray scale. This analysis reveals the presence of two glasses by a darker and lighter region on the cross-section of the fiber, and shows the interface of the two glasses.

The "deviation ratio" is the ratio (expressed in percent) of r to R, where R is the radius of a fiber cross-section and r is the closest distance from the fiber center to the interface of the two glasses. Where the fiber cross-section is not round, the radii are measured perpendicular to the interface. Where the interface is curved, a straight line interface is approximated.

The deviation ratio is a measure of how far the A/B glass ratio is away from 50:50. The larger the deviation from 50:50, the larger r will be as a percent of R. It has been found that the average deviation ratio of the irregularly-shaped glass fibers of the invention is typically greater than about 5%, generally greater than about 15%, and in many cases greater than about 30%.

Figure 9:
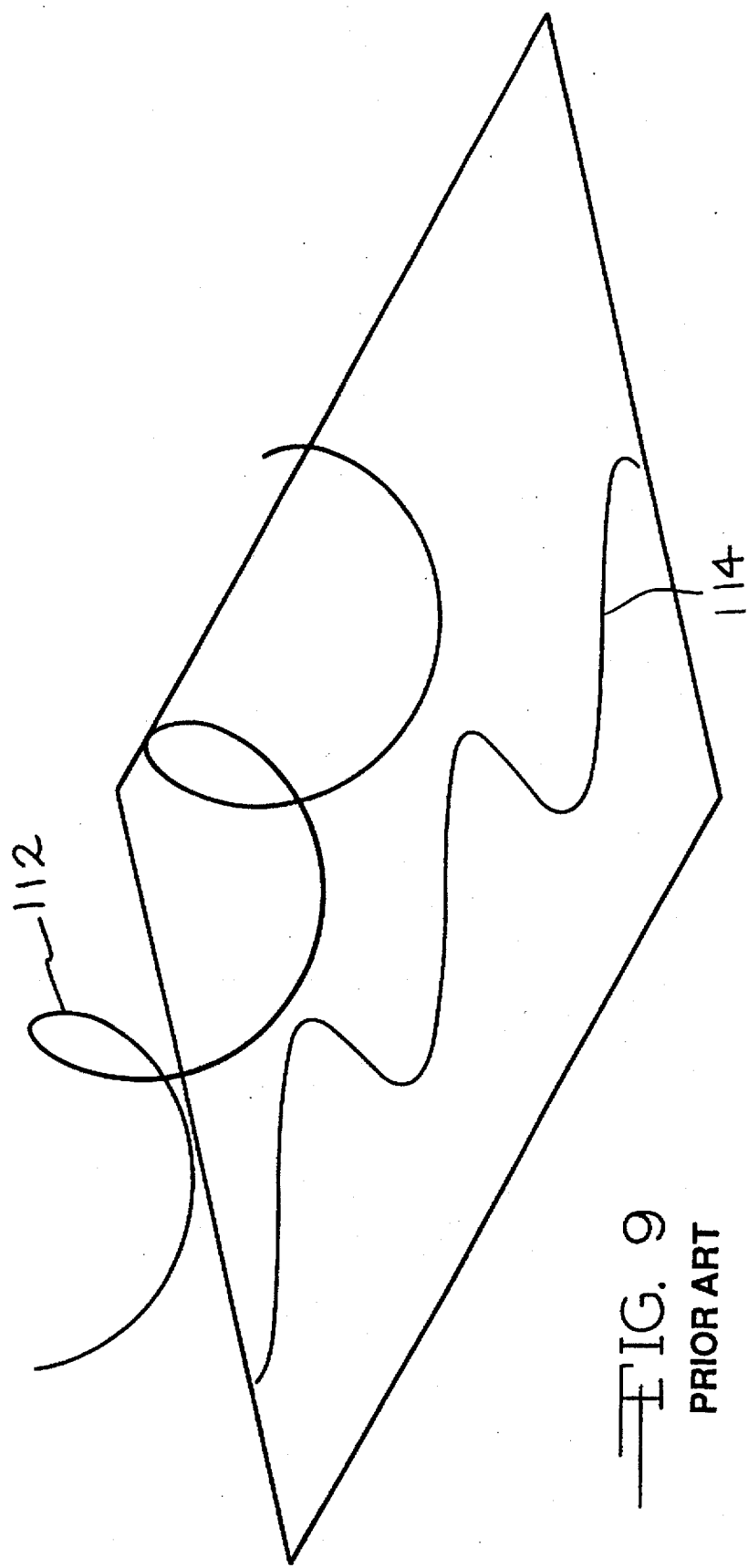
FIG. 9 is a schematic view in perspective of a helical glass fiber of the prior art.

Dual-glass fibers have a curvilinear nature due to the difference in thermal expansion coefficients of the two glasses. As a dual-glass fiber cools, one glass composition contracts at a faster rate than the other glass composition. The result is stress upon the fiber. To relieve this stress the fiber must bend. If no rotation of the fiber is introduced, a flat coil having a generally constant radius of curvature will be produced, the coil being in one plane such as in a clock spring. Rotation of dual-glass fibers can be measured by reference to the interface along the fiber between the two glass components. In order to get out of the plane, some rotation must be introduced. Constant rotation of the fibers will produce a helix having a constant pitch. The fiber making up the helix has a constant direction of rotation— either clockwise or counter-clockwise. The helix also has a generally constant radius of curvature. FIG. 9 shows a 3-dimensional schematic projection of helical fiber 112 of the prior art. As an aid to visualization, the shadow 114 of the fiber cast by an overhead light onto a flat surface has been added.

Figure 11:
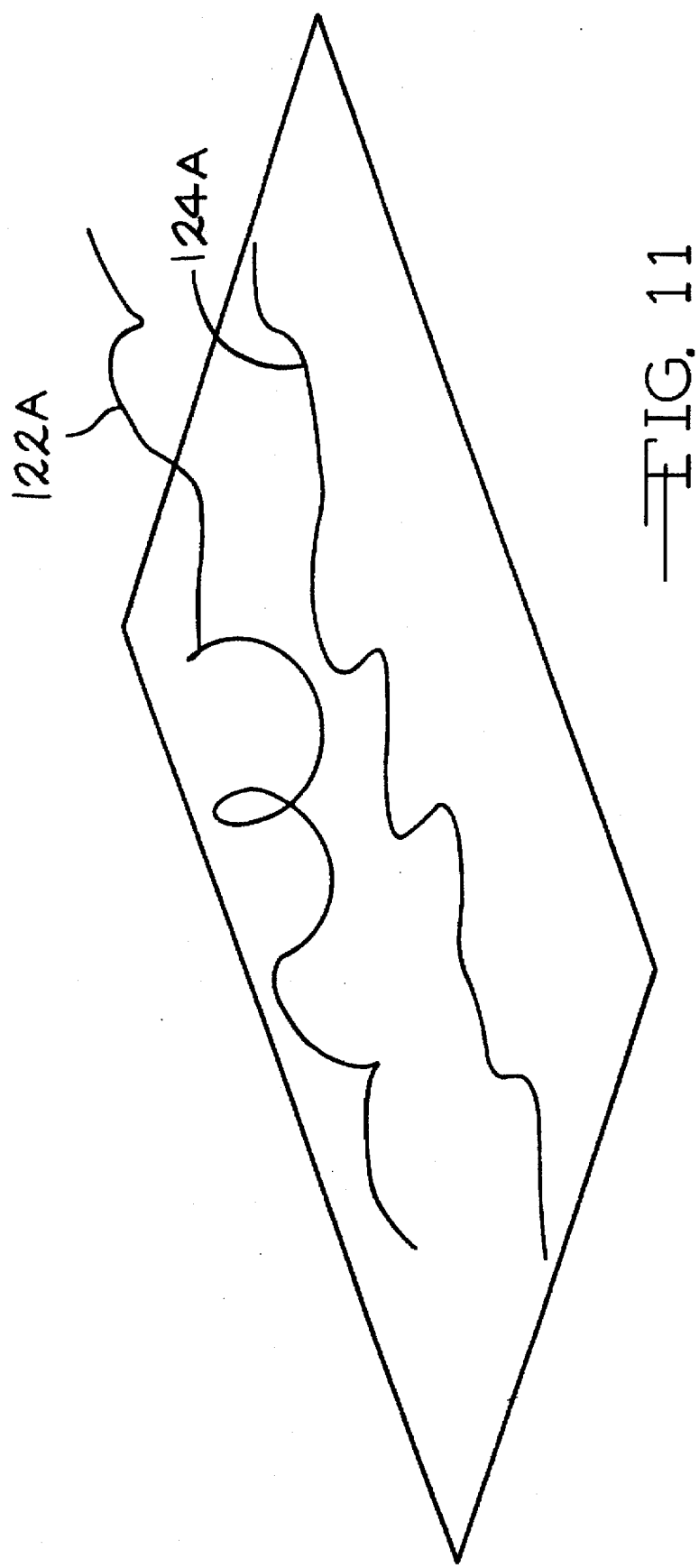
FIG. 11 is a schematic view in perspective of the fiber of FIG. 10 in a stretched state.

An irregularly-shaped fiber of the invention differs from a helical fiber in that the rotation of the fiber is not constant, but rather varies irregularly both in direction (clockwise and counter-clockwise) and in magnitude. The magnitude of rotation of a fiber is how fast the fiber rotates per unit length of the fiber. The curvature is generally constant as dictated by the difference in thermal expansion coefficients and the A/B proportion. shows a 3-dimensional projection of an irregular fiber 122 of the invention. As an aid to visualization, the shadow 124 of the fiber cast by an overhead light onto a flat surface has been added. When fiber 122 is put under tension, the tensioned fiber 122A and shadow 124A illustrate that the irregularity of the fiber is maintained, as shown in FIG. 11.

Figure 10:
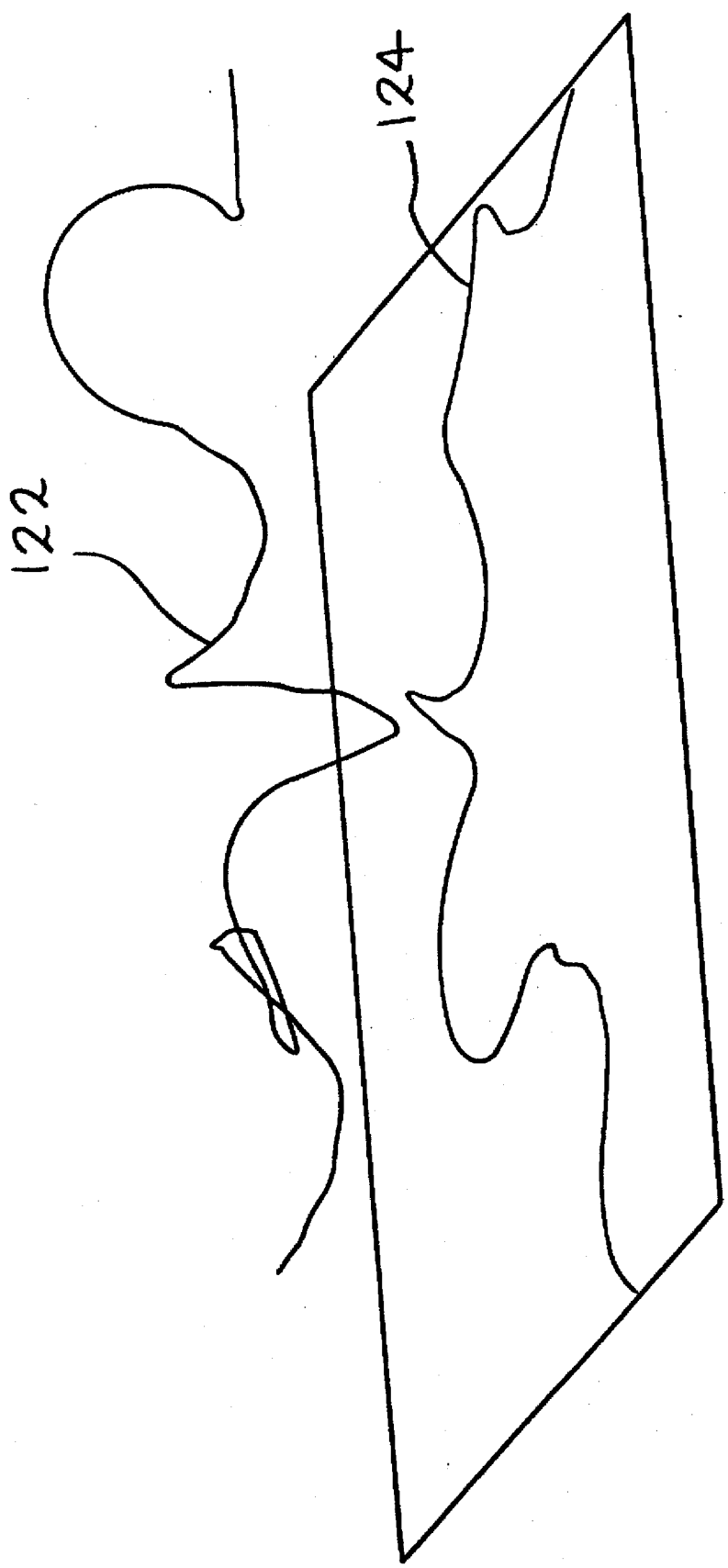
FIG. 10 is a schematic view in perspective of an irregularly-shaped glass fiber of the present invention in a natural, unconstrained state.
Figure 12:
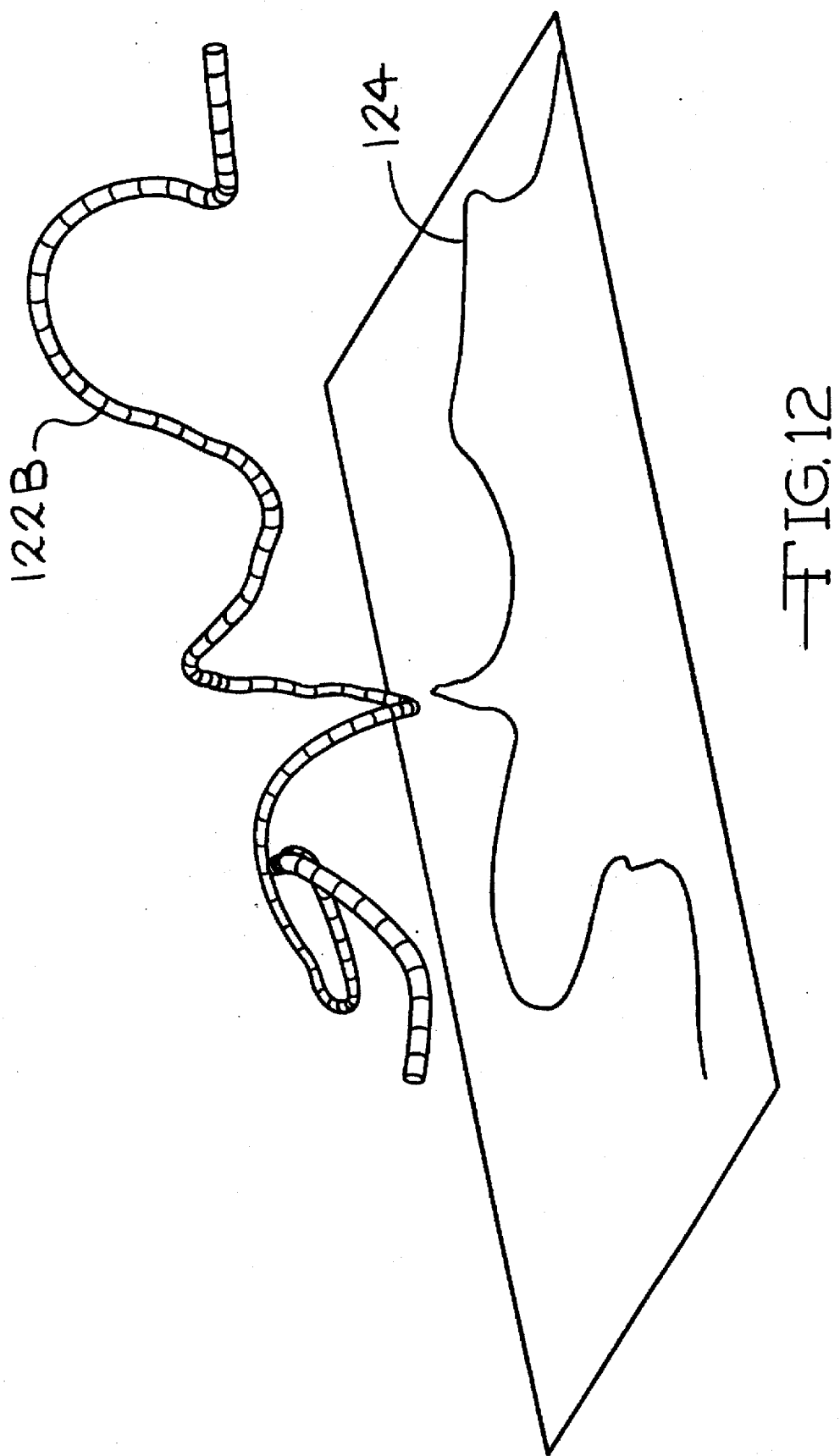
FIG. 12 is an artistically enhanced schematic view in perspective of the irregularly-shaped glass fiber of FIG. 10.

Irregular fiber 122B, shown in FIG. 12, is fiber 122 of FIG. 10 artistically enhanced by exaggerating the thickness and by adding segmentation lines to show better perspective.

Due to a continuously changing attenuation environment, each irregularly-shaped fiber is twisted in a unique way. No two fibers are exactly alike. The fiber's final shape is one with a baseline curvature due to the dual-glass nature, which is modified by the twisting, irregular rotation of the plane of curvature caused by the continuously changing or stochastic attenuation environment. The fiber has a baseline curvature that is twisted through three dimensions. It is generally not helical. The fiber's irregular nature allows the irregularly-shaped glass fibers to stand apart from one another and achieve a uniform volume filling nature. Additionally, wool insulation material made of irregularly-shaped glass fibers is less irritating (not as itchy) to the skin as wool insulating materials made with primarily straight fibers, and may not be as dusty.

The nature of the irregularly shaped fibers was analyzed using a direction vector analysis. The set of coordinates describing the path of an irregularly shaped fiber in 3-D space was generated using photographs taken from two different angles, 90° apart. The coordinates were adjusted to give equal three dimensional distances between the data points along the length of the fiber, resulting in adjusted coordinate data points (ACD). Three vectors were computed for each of the ACD's as follows:

$\overline{V}_i$=Fiber direction vector (a unit vector directed from one ACD to the next)

$\overline{F}_i$=First derivative vector of $\overline{V}_i$ with respect to the distance interval between ACD's $\overline{S}_i$=Second derivative vector of $\overline{V}_i$ with respect to the distance between ACD's.

The magnitude of rotation $R_i$ for any given ACD is as follows:

$R_i = \overline{S}_i \cdot \overline{U}_i$ (vector dot product), where $$\overline{U}_i = \frac{V_i \times V_{i-1}}{V_i \times V_{i-1}} \text{ (vector cross product)}$$

$\overline{U}_i$ is a unit vector perpendicular to the plane containing $V_i$ and $V_{i-1}$.

Figure 13:
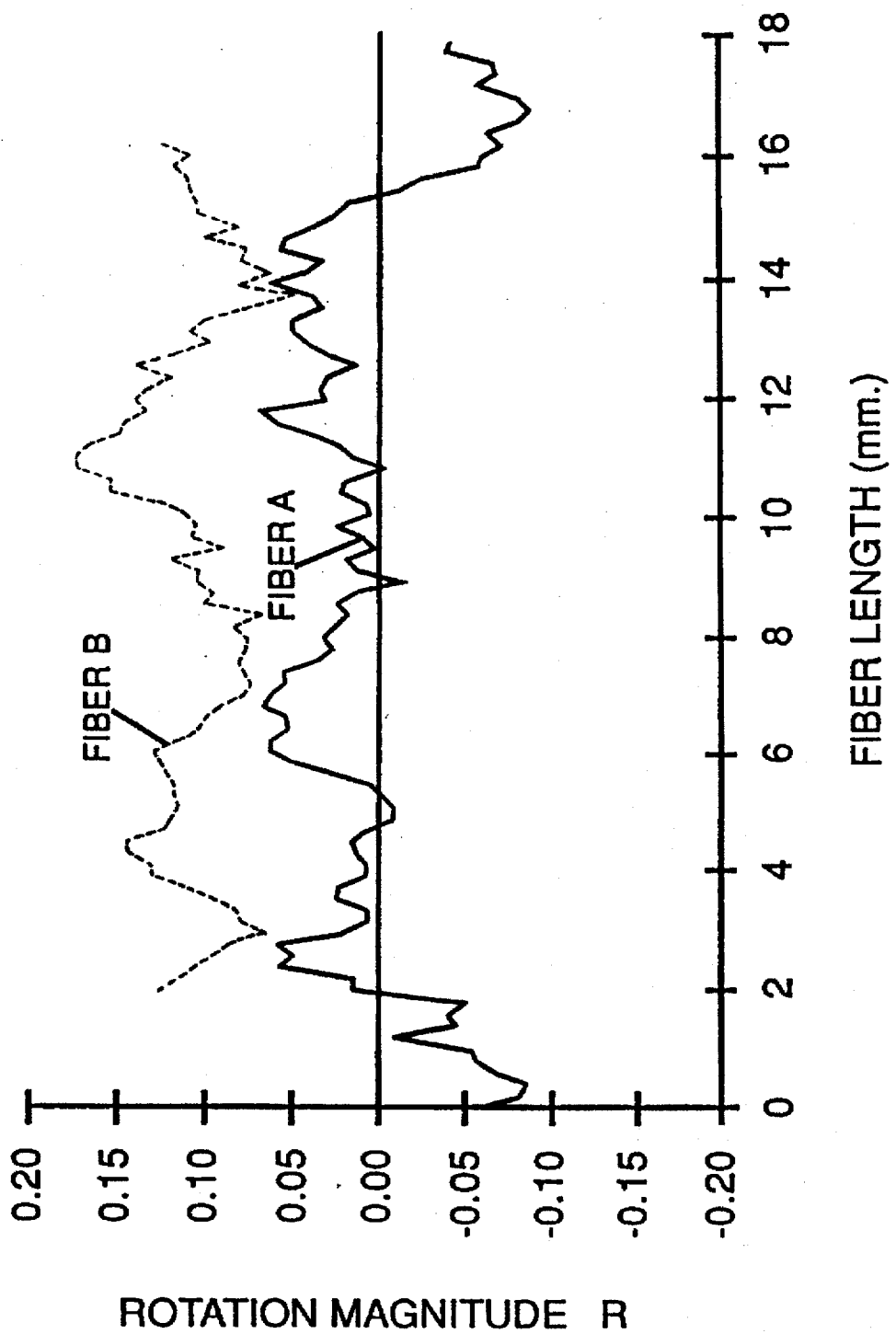
FIG. 13 is a graph of the magnitude of rotation of both a helical fiber and an irregularly-shaped fiber.

The magnitude of rotation R can be plotted as a function of distance along the length of the fiber as shown in FIG. 13. The graph shows the magnitudes of rotation of the irregular fiber shown in FIG. 10 (fiber A) and the helical fiber shown in FIG. 9 (fiber B). The data in FIG. 13 has been smoothed with a 5 point weighted moving average to reduce noise accentuated by the derivatizing process. As can be seen from the graph, the rotation of an unconstrained irregularly shaped fiber of the invention (fiber A) varies irregularly in magnitude and sign along the length of the fiber. The crossover points (i.e. where the rotation changes sign) occur at a frequency of about one per centimeter for the five micron diameter fiber A. In contrast, the helical fiber (fiber B) has zero crossover points during the same length. It is expected that the number of crossover points per centimeter of the irregular fibers of the invention for a 5 micron diameter fiber will be at least 0.3 and most likely within the range of from about 0.5 to about 5.0.

Another way to quantify the irregularity of the fibers is to calculate the average rotation magnitude and the standard deviation of the rotation magnitudes along the length of the fibers. Referring to FIG. 13, the average value for the magnitude of rotation R for the helical fiber (fiber B) is well above zero (or well below zero for opposite rotation). The standard deviation of the magnitude of rotation R for the helix is smaller than the average value of the magnitude of rotation R. In FIG. 13 the ratio of standard deviation to the average magnitude of rotation is 0.25 for the helical fiber (fiber B).

In contrast, for the irregularly shaped fiber of the invention (fiber A), the average magnitude of rotation R is very small, being generally close to zero. The standard deviation of the magnitude of rotation is at least comparable to the average magnitude of rotation R, if not significantly larger than the average magnitude of rotation R. Preferably, the ratio is greater than about 0.75. More preferably, it is greater than 1.0 and most preferably it is greater than 5.0. The ratio of the standard deviation to the average magnitude of rotation for fiber A is 8.3.

The irregular shape of the fibers gives the wool insulating material a more uniform volume filling nature. The primarily straight fibers of the prior art are arranged haphazardly in the wool pack. They are not uniform in volume filling. By uniform volume filling it is meant the fibers have a desire to spread out and fill the entire volume available to them in a uniform manner. A more uniform volume filling nature allows a more efficient use of glass fibers to resist the flow of heat.

X-ray computer tomography (CAT scan) testing has shown that the irregularly-shaped fibers employed in the present invention, due to their natural desire to stand apart, give a much more uniform volume filling nature than prior art standard glass fibers. In CAT scan testing of the density of wool packs, the wool pack of standard glass fibers of the prior art shows a standard deviation of roughly twice that of the pack of irregularly-shaped fibers. Thus, there is a significantly lower amount of variation of density in the pack made of irregularly-shaped fibers indicating a substantially uniform volume filling nature.

The uniform volume filling nature of a wool insulating material may be additionally indicated by measuring thermal conductivity. Building insulation products are quantified by their ability to retard heat flow. Resistance to heat flow or R value is the most common measure of an insulation product's ability to retard heat flow from a structure. R-value is defined by the equation: R value=t/k, where R-value is resistance to heat flow in $hrft^2°F/Btu$ ($m^2°C/Watt$); t is recovered thickness in inches; and k is thermal conductivity in Btu in/$hrft^2°F$. (Watt/m°C.).

Thermal conductivity or k value is a measure of a material's ability to conduct heat. Thus, the lower a material's k value the better that material is as an insulator. Also, the more uniform the lattice of the material, the greater that material's insulation ability. Thus, thermal conductivity can be a measure of the uniform volume filling nature of the insulation material.

Insulation products of the present invention result in a substantial reduction in k values from that of the prior art at identical product density and fiber diameter. For wool insulating material at a fixed product density, 0.3 to 0.6 pcf (4.8 to 9.6 Kg/$m^3$), and fixed fiber diameter, wool batts of the present invention show k values of from 10 to 17 k points lower than those of the best standard products of the prior art. At this density, one k point, or thousandths k, translates to approximately ½% glass fiber density needed for equivalent thermal performance. Thus, the wool insulating material of the present invention requires approximately 5 to 8½% less glass than the prior art material to reflect the same k values and generate an equivalent R value. A comparable weight savings will be seen in medium and high density insulating materials. Insulation products of the invention preferably exhibit improved k values of less than about 0.300 Btu in/$hrft^2°F$. (0.0432 Watt/m°C.) at 0.5 pcf (8.0 Kg/$m^3$) and at an effective fiber diameter of 5 microns. Most preferably, the improved k values are less than about 0.295 Btu in/$hrft^2°F$. (0.0425 Watt/m°C.) at 0.5 pcf (8.0 Kg/m) and at an effective fiber diameter of 5 microns.

Insulation products are packaged in high compression in order to ship more insulation in a defined volume, such as a truck. At the point of installation the insulation product is unpackaged and the product expands or recovers. The thickness to which the insulation product recovers is referred to as the recovered thickness. A specific thickness of insulating material is required to perform to a specified R value.

The ability of an insulation product to recover depends upon both the uncompressed product density and the density to which the product is compressed. Wool insulating material can be generally classified into three broad categories: light, medium and heavy density. Light density insulation products are those with a product density within the range of 0.3 to 0.6 pcf (4.8 to 9.6 Kg/$m^3$). Medium density insulating materials are those with a product density of from 0.6 to 0.9 pcf (9.6 to 14.4 Kg/$m^3$). Heavy density wool insulating materials are those higher than 1.0 pcf (16 Kg/$m^3$).

The compressed density is the density to which the wool batt can be compressed for shipping while still maintaining a satisfactory recovery. If a product is compressed to too high a density, a substantial portion of the glass fibers may break. As a result, the product will not recover to a satisfactory thickness. For prior art light density insulation products of straight fibers, the maximum practical compressed density is from about 3 to about 6 pcf (48 Kg/$m^3$ to 96 Kg/$m^3$), depending on the product density.

Light density wool insulating materials of the present invention produce dramatically improved recovery properties. This increase in recovery ability is due to the unique shape and properties of the irregularly-shaped fibers. Due to the binderless nature of the irregularly-shaped glass fibers of the present invention, one would expect them to slide upon compression as do the binderless straight fibers of the prior art. However, the irregularly-shaped fibers cannot slide very far because the irregular shape catches on neighboring fibers, thereby preventing significant movement. Further, there is no binder placing stress on the fibers near the intersections. Rather, the irregularly-shaped fibers of the present invention twist and bend in order to relieve stress. Thus, the fibers'positions are maintained and any available energy for recovery is stored in the fiber. This stored energy is released when the compression is removed and the fibers return to their recovered position.

The term recovery ratio in the present invention is defined as the ratio of recovered density to compressed density, after an insulation product is compressed to the compressed density, unpackaged, and allowed to recover to the recovered density, according to ASTM C167-90. For example, an insulation product compressed to a density of 6 pcf (96 Kg/$m^3$) which recovers to 0.5 pcf (8 Kg/$m^3$) has a recovery ratio of 12:1. Light density wool batts of the present invention may be compressed to a compressed density within the range of about 6 to about 18 pcf (96 to 288 Kg/$m^3$) and recover to a recovered density of within the range of about 0.3 to about 0.6 pcf (4.8 to 9.6 Kg/$m^3$). This is a recovery ratio within the range of from 12:1 to about 50:1. Preferably, insulation products of the invention will be compressed to a compressed density within the range of from about 9 to about 18 pcf (144 to 288 Kg/$m^3$) and recover to a recovered density within the range of from about 0.3 to about 0.6 pcf (4.8 to 9.6 Kg/$m^3$. Most preferably, the light density insulation products are compressed to a density of within the range of from about 9 to about 15 pcf (144 to 240 Kg/$m^3$) and recover to a recovered density of within the range of from about 0.3 to about 0.5 pcf (4.8 to 8 Kg/$m^3$).

The effect of this dramatic increase in the amount of compression that can be applied to light density insulation products of the present invention while still maintaining a satisfactory recovered density is significant. For standard R19 insulation products, compressed density can be increased from around 4 pcf (64 Kg/$m^3$) to about 12 pcf (192 Kg/$m^3$) by employing irregularly-shaped glass fibers of the present invention. This translates to around 3 times as much insulating material which can be shipped in the same volume shipping container, such as a truck or rail car. The potential savings in shipping cost is enormous. Additionally, the more highly compressed insulation products provide benefits in storage and handling for warehousing, retailing and installing the product.

To achieve the unique irregularly-shaped glass fibers of the present invention, specific compositions satisfying a number of restraints are required. The first constraint involves the coefficient of thermal expansion. There is no direct constraint on the values for the coefficient of thermal expansion of either glass A or glass B. Preferably, however, the coefficients of thermal expansion of glass A and glass B, as measured on the individual glasses by standard rod techniques, differ by at least 2.0 ppm/°C.

Another constraint for satisfactory commercial production of irregularly-shaped glass fibers is viscosity temperature, which is the temperature at which the glass viscosity is 1000 poise as measured by a standard rotating cylinder technique. It is commonly referred to as the log3 viscosity temperature. The log3 viscosity temperature is preferably within the range of from about 1850° F. (1010° C.) to about 2050° F. (1121° C.), more preferably within the range of from about 1900° F. (1037° C.) to about 2000° F. (1093° C.), and most preferably about 1950° F. (1065° C.).

An additional constraint of the glass is that of liquidus temperature. The liquidus of a glass is the highest temperature at which crystals are stable in the molten glass. With sufficient time, a glass at a temperature below its liquidus will crystallize. Crystallization in the furnace can lead to the formation of solid particles which, once passed to the fiberizer, become lodged in the orifices of the spinner, plugging them. The difference between the log3 viscosity temperature and the liquidus for each of glass A and glass B of the dual-glass composition in the present invention is preferably at least 50° F. (28° C.), and more preferably more than about 200° F. (111° C.) lower than the log3 viscosity temperature. If this constraint is not met, crystallization may occur in the lower (i.e. colder) part of the spinner blocking the spinner's orifices.

A further constraint on the glass composition of the present invention is glass durability. Durability relates to two glass wool pack properties. The first is the ability of the glass wool pack to recover when it is opened for installation. The second is the long term physical integrity of the glass wool pack. If the glass chemical durability is too low, upon installation the glass wool pack could fail to recover to its design thickness. Whether the wool pack fails to fully recover or disintegrates too quickly, the result is a failure of the wool pack to adequately insulate.

A useful measure of the chemical durability of a glass fiber for an insulation application is obtained by measuring the percent weight loss of 1 gram of 10 micrometer diameter fibers after 2 hours in 0.1 liters of distilled water at 205° F. (96° C.). The durability so measured depends strongly on the composition of the glass fibers and, to a lesser, extent, on the thermal history of the fiber. To assure adequate performance of the wool pack, fibers of each of the dual glass compositions should exhibit a weight loss in this test of less than about 4% and preferably less than about 2.5%. In addition to its strong dependence on glass composition, the chemical durability of a glass fiber depends to a lesser extent on its thermal history. Thus, for example, heating a glass fiber for several minutes at 1000° F. (538° C.), will improve its chemical durability somewhat. It is understood that the limits on chemical durability disclosed here refer to measurements on glass fibers with no heat treatment other than that employed in their original attenuation.

Since glass wool insulation typically contains some fibers that are thin enough to be respirable if they break into short lengths, it is possible that some fibers may become airborne and be inhaled. In the body, they will be exposed to physiological fluids. To the extent that the dissolution rate of the fibers in the body plays a role in the biological activity of inhaled fibers, it may be preferable to produce glass fibers with a relatively high dissolution rate in such fluids. The dissolution rate of glass fibers is expressed as the dissolution rate constant measured for fibers in simulated lung fluid at 98° F. (37° C.). depends strongly on the glass fiber composition and, to a lesser extent, on its thermal history. It is preferable to use glass compositions having a dissolution rate constant of at least 100 ng/cm$^2$hr for all insulation fibers. Therefore the dissolution rate constant for fibers of each of the dual glass compositions is preferably at least 100 ng/cm$^2$hr. As with the chemical durability, subsequent heat treatment of the fiber will reduce its dissolution rate. It is understood that the 100 ng/cm$^2$hr limit refers to fibers formed into a wool insulation pack in the final product form.

The dual-glass compositions of the present invention comprising one high-borate, low-soda lime-aluminosilicate composition as glass A and one high-soda, low-borate lime-aluminosilicate composition as glass B satisfy all constraints necessary for a successful irregularly-shaped fiber. By high-borate, low-soda lime-aluminosilicate composition, it is intended that the glass composition have a borate content of within the range of about 14% to about 24% by weight of the total components. By a high-soda, low-borate lime-aluminosilicate composition, it is intended that the glass composition have a soda content within the range of from about 14% to about 25% by weight of the total components.

Preferably, the first glass composition comprises by weight percent from about 50 to about 61% silica or $SiO_2$, from about 0 to about 7% alumina or $Al_2O_3$, from about 9 to about 13% lime or CaO, from about 0 to about 5% magnesia or MgO, from about 14–24% borate or $B_2O_3$, from about 0 to about 10% soda or $Na_2O$, and from about 0 to about 2% potassium oxide or $K_2O$.

The second glass composition is preferably one which comprises by weight percent from about 52 to about 60% silica or $SiO_2$, from about 0 to about 8% alumina or $Al_2O_3$, from about 6 to about 10% lime or CaO, from about 0 to about 7% magnesia or MgO, from about 0 to about 6% borate or $B_2O_3$, from about 14 to about 25% soda or $Na_2O$, and from about 0 to about 2% potassium oxide or $K_2O$. It is understood that in each composition there will typically be less than about 1% total of various other constituents such as, for example $Fe_2O_3$, $TiO_2$ and SrO, not intentionally added to the glass, but resulting from the raw materials used in the batch formulation.

More preferably, the dual-glass composition of the present invention comprises a first glass composition containing approximately 52–57% silica, 4–6% alumina, 10–11% lime, 1–3% magnesia, 19–22% borate, 4–6% soda, 0–2% potassium oxide, and a second glass composition containing approximately 57–65% silica, 2–6% alumina, 8–9% lime, 4–6% magnesia, 0–6% borate, 15–21% soda, and 0–2% potassium oxide.

EXAMPLE 1

Irregularly-shaped glass fibers of the present invention were produced in a batch-mode low throughput laboratory spinner according to the process of the present invention. Test squares of wool batts were then produced from 50 grams of the fibers in an 8×8 inch sample. The recovery of these test squares was measured by comparing the recovered thickness to the compressed thickness. The compression was for one week at 12 pcf (192 Kg/m$^3$).

A standard bindered insulation product of the prior art showed a recovery ratio of 18:1. Standard binderless wool insulating material of the prior art showed a recovery ratio of 14.4:1. Binderless irregularly-shaped wool insulating material of the present invention showed a recovery of from 32:1 to 34:1 for three samples tested.

EXAMPLE 2

The thermal conductivity of wool insulating material at 0.5 pcf and a diameter of 5 microns were measured using ASTM test C518. For twenty samples tested, the average of a standard bindered wool batt was 0.308 k value. For twenty samples tested of the irregularly-shaped wool insulating material of the present invention, the average was 0.291 k value, indicating a difference of 17 k points. As one k point represents roughly ½% glass, the wool insulating material of the present invention requires 8½% less glass than the prior art material to achieve the same R value.

We claim:

1. A glass fiber insulation product in the form of a binderless pack of irregularly-shaped glass fibers having a k value of less than 0.300 Btu in/hrft$^2$°F. (0.0432 Watt/m°C.) at 0.5 pcf (8.0 Kg/m$^3$) and at an effective fiber diameter of 5 microns.

2. The insulation product of claim 1, wherein the irregularly-shaped glass fibers are sufficiently entangled such that the insulation product has integrity upon suspension under its own weight.

3. The insulation product of claim 1 having a k value of less than 0.295 Btu in/hrft$^2$°F. (0.0425 Watt/m°C.) at 0.5 pcf (8.0 Kg/m$^3$) and at an effective fiber diameter of 5 microns.

* * * * *